United States Patent Office 2,757,415
Patented Aug. 7, 1956

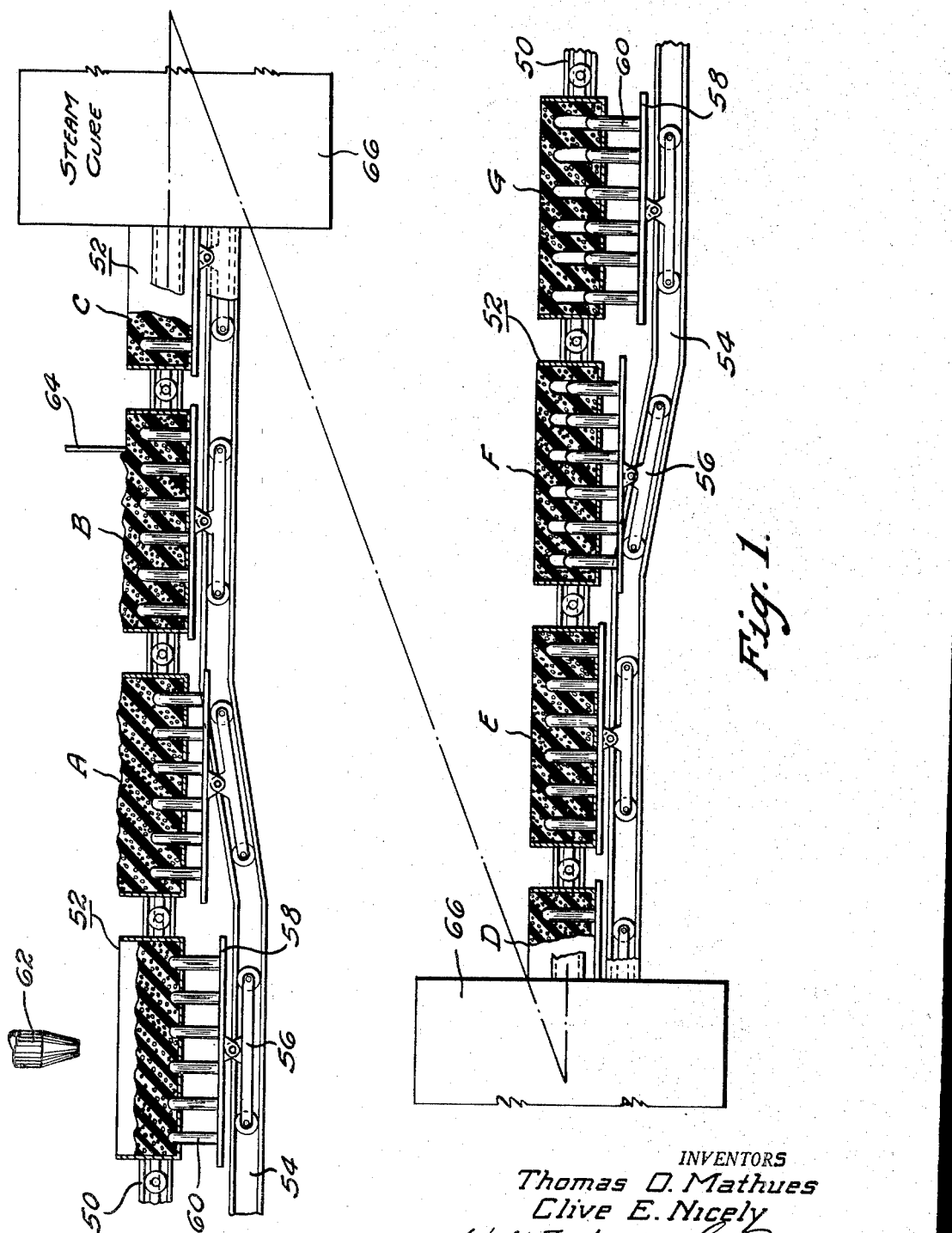

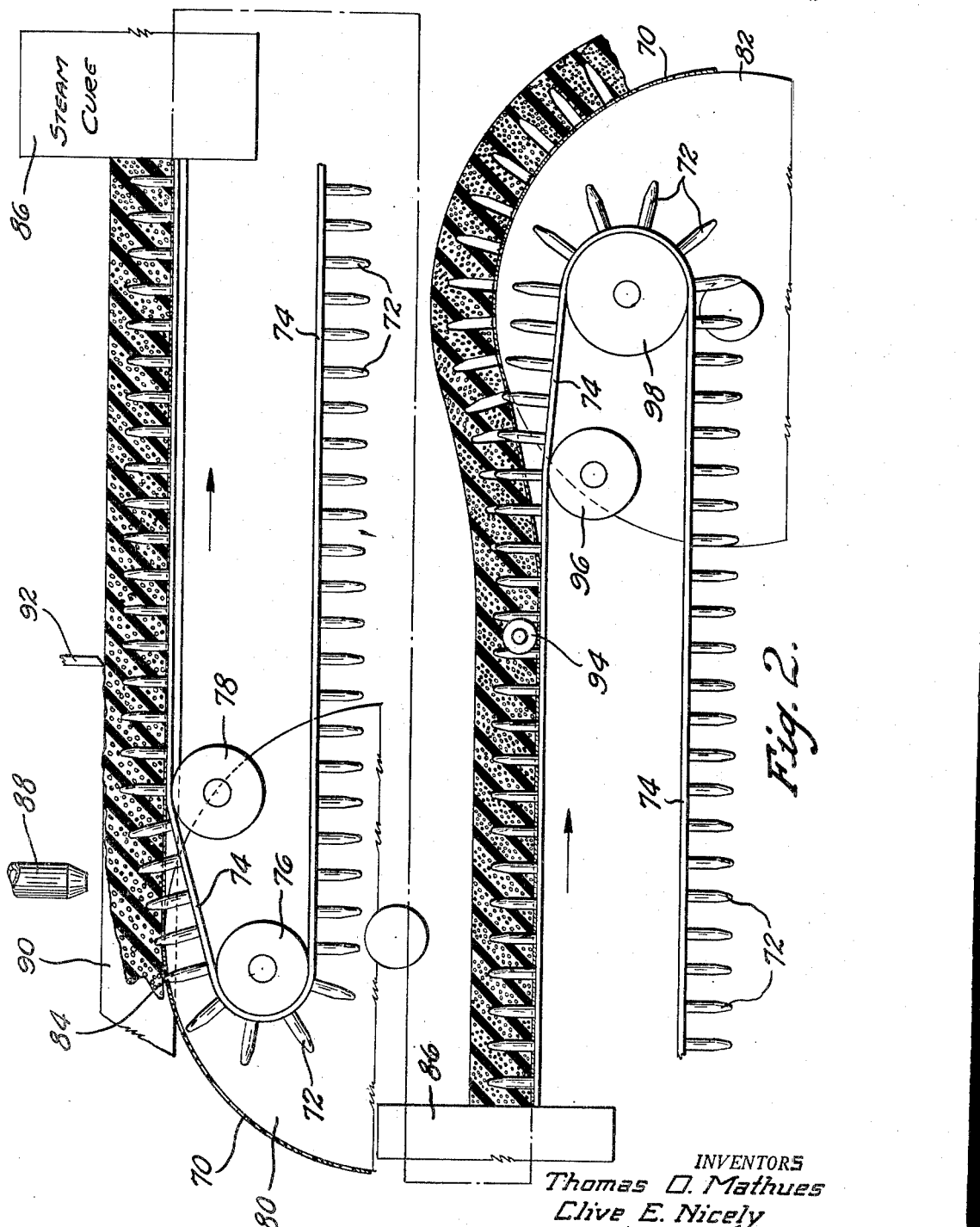

2,757,415

METHOD OF MOLDING ARTICLES FROM FOAMED LATEX

Thomas O. Mathues and Clive E. Nicely, Dayton, Ohio, assignors to General Motors Corporation, Detroit, Mich., a corporation of Delaware Application May 5, 1951, Serial No. 224,766

1 Claim. (Cl. 18—53)

The present invention relates to methods for forming articles from foamed latex.

It is an object of the invention to provide a method for molding cored foamed latex articles.

In carrying out the above object, it is a further object of the invention to provide a method wherein foamed latex articles may be made in molds which have a complete fill around the base of the cores as occasioned by the particular method disclosed herein. In this manner, cored foamed latex articles may be fabricated free from imperfections and blow holes, etc., around the base of the cores.

A still further object is to provide a method for continuously making cored foamed latex articles wherein a plurality of molds on an endless conveyor are utilized, which molds are automatically manipulated through a series of steps to provide the desired results.

Further objects and advantages of the present invention will be apparent from the following description, reference being had to the accompanying drawings, wherein preferred embodiments of the present invention are clearly shown.

In the drawings:

Fig. 1 is a diagrammatic view of a continuously operated apparatus for molding and curing latex foam.

Fig. 2 is a diagrammatic view of an apparatus for making a continuous sheet of cured latex foam.

In the manufacture of foamed latex articles, either from heat sensitive latex foam or from latex foam including a delayed coagulant or the like, it is the usual practice to produce the foam by well known methods and then pour said foam into a mold where it is set, either by heat or, upon a predetermined delay, by a delayed coagulant incorporated therein. The mold is then placed in a curing retort or oven wherein the gelled foamed latex is vulcanized or cured. This is usually accomplished in open steam although any suitable curing method may be used. After the latex foam is cured, it is removed from the mold and presents a spongy article having high utility for a number of applications.

Some of said applications are in seat cushion material, mattresses and the like. Articles for use in these applications are generally rather thick in cross section and in order to obtain a satisfactory cure it is usually necessary to core the article through the use of a number of hollow cores extending into the foam into which steam may pass thereby effecting a more rapid and more uniform cure of the mass of foam in the mold.

In other instances, the use of cores is effected to conserve material and vary and/or control the spring rate of the cushion. In this case, the cores may or may not be hollow. In some instances, the cores serve the dual purpose.

The usual practice in molding a cored article of this character is to fill a box-like structure or mold with foam and then place a cover plate in place, which cover plate has depended therefrom a plurality of cores. As these cores are inserted in the foam within the main portion of the mold, the foam rises and some of the same leaks out around the edges of the box to present a presumably well filled mold. However, in almost every instance, the cured article shows blow holes or imperfect fills around the bases of the cores. This difficulty is caused by entrapped air which cannot be removed from the molds due to the method of inserting the cores and in closing the mold.

The same difficulty is apparent if the cores are provided in the base of the mold wherein a flat cover is utilized, the foam is poured into the mold and never fills around the base of each core perfectly. These imperfections, while not important to the use of the article, present a poor appearance and, furthermore, make it difficult to provide uniform inspection since it is impossible to set forth inspection instructions to the degree of fill around the base of cores and in this connection, one inspector will reject a part that another inspector will pass, thereby making a very non-uniform product. Then too, the entrapped air, in some instances, prevents the formation of a skin at this portion which reduces the strength of the article to some extent.

The present methods have the drawback of being messy in production with the foam squeezing out around the mold covers and if the cores are provided in the bottom of the mold, create difficulties in stripping the cured article from the mold.

Our invention is directed to an effective method of using a mold wherein all of the past difficulties are eliminated and wherein perfectly filled molds are the rule. Furthermore, our method eliminates past difficulties in filling and stripping and permits the use of open steam in direct contact with the entire top surface of the article.

Figure 1 shows one method of accomplishing a complete fill, wherein a continuous track 50 is utilized including a plurality of molds 52 carried thereon. The track 50 is endless and perfectly level so that the molds 52 always remain in the same plane. Beneath the track 50 is a second track 54 which may be termed a cam track. This cam track includes a plurality of carriers 56 thereon, each carrying a core plate 58 that includes cores 60 thereon. Each core plate 58 is held in exact alignment position with respect to its associated mold 52. The cam track 54 is so designed that the cores 60 are retracted from the molds 52 in a position directly beneath a supply nozzle 62 which supplies a predetermined volume of latex foam to the mold. As the mold 52 progresses to the next position, the cam track 54 rises to cause the core plate 58 to rise and thereby insert the cores into the latex. This is noted at A in Fig. 4. In position B of Fig. 4, the cores 60 are fully inserted and a fixed doctor blade 64 scrapes the top of the mold level. In position C, the filled mold is entering a curing retort 66. In position D, the mold with the cured cushion therein is emerging from the retort wherein the molded article is cooled at E whereupon the cam track 54 is directed downwardly at F to start retraction or stripping of the cores which is completed at G. The cushion is then removed from the mold and the mold continues on the track until it again reaches the position beneath nozzle 62 when the entire operation is repeated.

Fig. 2 is a diagrammatic view showing another type of apparatus which may be used to fabricate continuous sheets or strips of cored, cured foamed latex. In this embodiment a flexible thin sheet of metal 70 is used which is perforated to receive cores 72 carried by a flexible belt 74. The cores are preferably tapered and are aligned with the apertures in the metal belt 70 so as to enter the apertures gradually as occasioned by the slope of belt 74 carried by rollers 76 and 78. The perforated sheet or belt 70 is carried by larger diameter rollers 80 and 82. Thus the cores 72 commence to enter the apertures in belt 70 at 84 and progressively are further inserted as the two belts move concomitantly and in exact alignment toward the curing oven 86. As the cores close the apertures in belt 70, latex foam is supplied to the surface of the belt through a nozzle 88. The foam is held on the belt 70 by side rails or plates which press firmly against the edges of the belt, one of said rails being shown at 90. After the desired depth of foam is obtained on the belt 70 and the cores 72 are fully inserted, a doctor blade 92 bearing on the side rails scrapes the top of the foam level whereupon it enters the oven or retort 86 where the foam is cured. Upon emerging from the oven 86, the perforated belt 70 is preferably curled upwardly slightly through the coordinated action of rollers 94 and 82 while the belt 74 moves downwardly through the action of rolls 96 and 98 whereupon the belts 70 and 74 separate for causing the cores 72 to be stripped from the cured sheet of foamed latex. This stripping action is easily accomplished due to the resiliency of the foam and the tape on the core pins.

It is apparent that the apparatus, shown in Fig. 2, is merely diagrammatic since the larger the diameter of the carrying rolls for belt 70 and the shorter the cores 72, the more facile will be the insertion and withdrawal of the cores. Obviously, this is controlled to a large measure by the thickness of the foamed sheet which is desired to be manufactured and in all cases, the variable factors involved may be calculated and regulated so as to produce satisfactory results.

After the foamed sheet is finally removed from the surface of the belt 70, it may be cut to any length desired. In this instance, the side rails, one of which is shown at 90, carry through and extend to approximately the middle of the retort, at which time the latex foam has become gelled and partially cured and the rails are stripped therefrom. If desired the extent of the rails may carry through the oven with a gradual increase in width therebetween to cause a stripping action as the belt 70 progresses. Similarly, the side rails may also be carried by rollers and may move at the same rate as the belt 70. All of these modifications are fully within the scope of the invention and all will yield satisfactory results in the manufacture of a continuous length of cured foam.

In all cases it is desirable to dry and suitably preheat the molds and mold surfaces, etc., for conditioning same before use. It is also desirable to coat the mold surfaces and cores with a satisfactory mold lubricant by spraying or brushing. Any commercial mold lubricant may be used.

While the embodiments of the present invention as herein disclosed, constitute preferred forms, it is to be understood that other forms might be adopted.

What is claimed is as follows:

In a continuous method of molding a cored latex foam on a perforated mold surface having associated cores insertable and retractable therethrough to close the perforations to the flow of foam, the steps comprising; providing a continuous perforated mold surface and a separate continuous belt of cores aligned with and insertable through said perforations in said mold surface, continuously coating a portion of said mold surface and the cores adjacent thereto with a suitable mold lubricant, progressively partially inserting said cores through the perforations in said surface to close the perforations therein, progressively depositing latex foam on the surface wherein the perforations have been closed, then progressively fully inserting the cores for raising the level of said foam to the desired level wherein the cores are covered with foam, continuously leveling the foam over said cores, continuously curing the leveled foam on said surface and around said cores and progressively stripping the cores at least partially from the cured foam and finally striping the cured foam from said mold surface.

References Cited in the file of this patent

UNITED STATES PATENTS

| | | |
|---|---|---|
| 1,469,820 | Ruby | Oct. 9, 1923 |
| 1,527,041 | Garvin et al. | Feb. 17, 1925 |
| 1,534,361 | Craig | Apr. 21, 1925 |
| 2,180,304 | Minor | Nov. 14, 1939 |
| 2,341,499 | Cunningham | Feb. 8, 1944 |
| 2,395,920 | Te Grotenhuis | Mar. 5, 1946 |
| 2,441,235 | Blair et al. | May 11, 1948 |